(12) United States Patent
Kang et al.

(10) Patent No.: US 11,264,036 B2
(45) Date of Patent: Mar. 1, 2022

(54) NEURAL NETWORK DEVICE FOR SPEAKER RECOGNITION AND OPERATING METHOD OF THE SAME

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Sungchan Kang, Hwaseong-si (KR); Namsoo Kim, Seoul (KR); Cheheung Kim, Yongin-si (KR); Hyungyong Kim, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 232 days.

(21) Appl. No.: 16/544,382

(22) Filed: Aug. 19, 2019

(65) Prior Publication Data

US 2020/0211566 A1 Jul. 2, 2020

(30) Foreign Application Priority Data

Dec. 31, 2018 (KR) .......................... 10-2018-0174224

(51) Int. Cl.
*G10L 17/14* (2013.01)
*G10L 17/04* (2013.01)
*G10L 17/18* (2013.01)
*G10L 25/84* (2013.01)
*G06N 3/08* (2006.01)
(Continued)

(52) U.S. Cl.
CPC ............ *G10L 17/04* (2013.01); *G06N 3/0454* (2013.01); *G06N 3/08* (2013.01); *G10L 17/06* (2013.01); *G10L 17/18* (2013.01); *G10L 25/84* (2013.01); *G10L 17/14* (2013.01)

(58) Field of Classification Search
CPC .............................. G10L 17/14; G10L 17/18
See application file for complete search history.

(56) References Cited

U.S. PATENT DOCUMENTS 8,346,545 B2 1/2013 Jung et al.
2003/0217021 A1* 11/2003 Jacobson ............. G05B 13/027
706/16
2009/0210227 A1 8/2009 Sugiyama et al.
(Continued)

FOREIGN PATENT DOCUMENTS

KR 10-1253102 B1 4/2013
KR 10-2019-0060028 A 6/2019

OTHER PUBLICATIONS

Tu, et al. "Speech Enhancement Based on Deep Neural Networks With Skip Connections," IEEE ICASSP, 2017. (Year: 2017).*

(Continued)

*Primary Examiner* — Feng-Tzer Tzeng
(74) *Attorney, Agent, or Firm* — Sughrue Mion, PLLC

(57) ABSTRACT

Provided are a method of generating a trained third neural network to recognize a speaker of a noisy speech signal by combining a trained first neural network which is a skip connection-based neural network for removing noise from the noisy speech signal with a trained second neural network for recognizing the speaker of a speech signal, and a neural network device for operating the neural networks.

20 Claims, 8 Drawing Sheets

(51) Int. Cl.
*G06N 3/04* (2006.01)
*G10L 17/06* (2013.01)

(56) References Cited

U.S. PATENT DOCUMENTS

| | | | |
|---|---|---|---|
| 2014/0195236 A1* | 7/2014 | Hosom | G06N 3/082 704/249 |
| 2016/0148079 A1* | 5/2016 | Shen | G06N 3/0454 382/157 |
| 2017/0185894 A1 | 6/2017 | Volkovs et al. | |
| 2018/0075343 A1 | 3/2018 | van den Oord et al. | |
| 2019/0156837 A1 | 5/2019 | Park et al. | |

OTHER PUBLICATIONS

Shi, et al., "Speech Enhancement using Convolutional Neural Network with Skip Connections," International Symposium on Chinese Spoken Language Processing, 2018. (Year: 2018).*

Tu, et al., "Speech Enhancement Based on Deep Neural Networks With Skip Connections," ICASSP 2017. (Year: 2017).*

Tan and Mak, I-Vector DNN Scoring and Calibration for Noise Robust Speaker Verification, Aug. 20-24, 2017, Interspeech 2017, 6 pages total.

* cited by examiner

NEURAL NETWORK DEVICE FOR SPEAKER RECOGNITION AND OPERATING METHOD OF THE SAME

CROSS-REFERENCE TO RELATED APPLICATION

This application is based on and claims priority from Korean Patent Application No. 10-2018-0174224, filed on Dec. 31, 2018, in the Korean Intellectual Property Office, the disclosure of which is incorporated herein in its entirety by reference.

BACKGROUND

1. Field

The disclosure relates to a neural network device for speaker recognition and a method of operation thereof.

2. Description of the Related Art

A neural network refers to a computational architecture that models a biological brain. Recently, with the development of neural network technology, various kinds of electronic systems have been actively studied for analyzing input data and extracting valid information using a neural network device.

In particular, various techniques using the neural network are applied to a voice recognition field, and the performance of voice recognition or speaker recognition is improving.

SUMMARY

Provided are a neural network device for speaker recognition, and a method of operation thereof.

Additional aspects will be set forth in part in the description which follows and, in part, will be apparent from the description, or may be learned by practice of the presented embodiments.

According to an aspect of the disclosure, there is provided a neural network device for speaker recognition, the neural network device comprising: a memory configured to store at least one program; and a processor configured to execute the at least one program to: receive first training information including a first input speech signal; train a first neural network using the first training information to generate a trained first neural network, the first neural network being a skip connection-based neural network configured to remove noise from the first input speech signal, receive second training information including a second input speech signal; train a second neural network using the second training information to generate a trained second neural network, the second neural network configured to recognize a speaker in the second input speech signal, generate a third neural network by combining the trained first neural network with the trained second neural network, receive third training information including a third input speech signal; and train the third neural network using the third training information to generate the trained third neural network, the third neural network configured to recognize a speaker in the third input speech signal, which is a noisy speech signal.

The first neural network may comprise a plurality of layers, and wherein the first neural network may be further configured to add a value of an input layer, among the plurality of layers, to a value of an output layer, among the plurality of layers, and output the value of the output layer as a value of a final output layer based on a skip connection.

The first training information may further include a first target speech signal that is obtained by removing noise from the first input speech signal as target information, and wherein the processor may be further configured to train the first neural network based on the first input speech signal and the first target speech signal.

The second training information may further include speaker identification information corresponding to the second input speech signal, and wherein the processor may be further configured to train the second neural network based on the second input speech signal and the speaker identification information.

The second input speech signal may comprise an estimated clean speech signal that is output from the first neural network during training of the first neural network.

The third training information may further include speaker identification information corresponding to the third input speech signal, and wherein the processor may be further configured to train the third neural network based on the third input speech signal and the speaker identification information.

The processor may be further configured to generate the third neural network by setting a final output layer of the trained first neural network as an input layer of the trained second neural network.

The neural network device may further comprise: an acoustic sensor configured to sense a noisy speech signal, wherein the processor may be configured to: obtain feature information for speaker recognition from the sensed noisy speech signal by using the trained third neural network, and recognize a speaker of the sensed noisy speech signal by comparing the feature information for speaker recognition with a pre-registered feature information for speaker recognition.

The processor may be further configured to obtain feature information for speaker recognition from the sensed noisy speech signal by extracting a value of a last hidden layer of the trained third neural network to which the sensed noisy speech signal is input.

The processor may be further configured to obtain a clean speech signal from the sensed noisy speech signal by extracting a value of a layer of the trained third neural network to which information about the sensed noisy speech signal is input.

The acoustic sensor may comprise at least one of a wide-band microphone, a resonator microphone, or a narrow-band resonator microphone array.

The neural network device may further comprising: an acoustic sensor configured to sense a noisy speech signal of a speaker, wherein the processor may be further configured to obtain feature information for speaker recognition from the noisy speech signal of the speaker by using the trained third neural network, and store the obtained feature information for speaker recognition in the memory together with the speaker identification information to register the speaker.

According to another aspect of the disclosure, there is provided an operating method of a neural network device for speaker recognition, the operating method comprising: receiving first training information including a first input speech signal; training a first neural network using the first training information to generate a trained first neural network, the first neural network being a skip connection-based neural network configured to remove noise from the first input speech signal; receiving second training information including a second input speech signal; training a second neural network using the second training information to generate a trained second neural network, the second neural network configured to recognize a speaker in the second input speech signal; generating a third neural network by combining the trained first neural network with the trained second neural network; receiving third training information including a third input speech signal; and training the third neural network using the third training information to generate the trained third neural network, the third neural network configured to recognize a speaker in the third input speech signal, which is a noisy speech signal.

The first training information may further include a first target speech signal that is obtained by removing noise from the first input speech signal, and wherein the training the first neural network may comprise training the first neural network based on the first input speech signal and the first target speech signal.

The second training information may further include speaker identification information corresponding to the second input speech signal, and wherein the training the first neural network may comprise training the second neural network based on the second input speech signal and the speaker identification information.

The second input speech signal may comprise an estimated clean speech signal that is output from the first neural network during the training of the first neural network.

The generating of the third neural network may comprise generating the third neural network by setting a final output layer of the trained first neural network as an input layer of the trained second neural network.

The operating method may further comprise: sensing a noisy speech signal; obtaining feature information for speaker recognition according to the sensed noisy speech signal by using the trained third neural network; and recognizing a speaker of the sensed noisy speech signal by comparing the feature information for speaker recognition with a pre-registered feature information for speaker recognition.

The operating method may further comprise: obtaining a clean speech signal about the sensed noisy speech signal by extracting a value of a layer of the trained third neural network to which information about the sensed noisy speech signal is input.

According to another aspect of the disclosure, there is provided a non-transitory computer-readable recording medium having a recorded program for executing the operating method in a computer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Terminologies used herein are selected as commonly used by those of ordinary skill in the art in consideration of functions of the current embodiment, but may vary according to the technical intention, precedents, or a disclosure of a new technology. Also, in particular cases, some terms are arbitrarily selected by the applicant, and in this case, the meanings of the terms will be described in detail at corresponding parts of the specification. Accordingly, the terms used in the specification should be defined not by simply the names of the terms but based on the meaning and contents of the whole specification.

It should be understood that, when a part "comprises" or "includes" an element in the specification, unless otherwise defined, it is not excluding other elements but may further include other elements. Also, in the specification, the term "unit(s)" denotes a unit that processes at least one function or operation, and the unit may be realized by software or hardware, or a combination of software and hardware.

The embodiments are related to a neural network device for speaker recognition, and a method of operation thereof, and aspects that are well known to those of ordinary skill in the art will be omitted.

Figure 1:
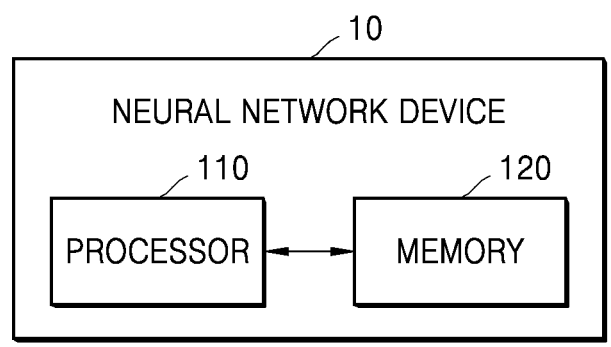
FIG. 1 is a block diagram of a hardware configuration of a neural network device according to an embodiment.

FIG. 1 is a block diagram of a hardware configuration of a neural network device according to an embodiment.

The neural network device 10 for speaker recognition (hereinafter, for convenience of explanation, referred to as the neural network device 10) is implemented with various types of devices such as a personal computer (PC), a server device, a mobile device, and an embedded device. In more detail, the neural network device 10 may be, but is not limited to, a smart phone, a tablet device, an augmented reality (AR) device, an Internet of Things (IoT) device, an autonomous vehicle, a mobile phone, a robot, a medical device, and the like that performs voice recognition, speaker recognition, image recognition, and image classification. Furthermore, the neural network device 10 may correspond to a dedicated hardware (HW) accelerator mounted on the devices mentioned above. The neural network device 10 may be, but is not limited to, an HW accelerator such as a neural processing unit (NPU), a tensor processing unit (TPU), a neural engine, and the like which is a dedicated module for driving a neural network.

Referring to FIG. 1, the neural network device 10 may include a processor 110 and a memory 120. Only components related to the present embodiments are shown in the neural network device 10 of FIG. 2. Therefore, it will be understood that the neural network device 10 may further include general components other than the components in FIG. 1 by one of ordinary skill in the art.

The processor 110 controls general functions for operating the neural network device 10. For example, the processor 110 generally controls the neural network device 10 by executing one or more instructions or programs stored in the memory 120 in the neural network device 10. The processor 110 may be implemented by, but is not limited to, a central processing unit (CPU), a graphics processing unit (GPU), an application processor (AP), or the like provided in the neural network device 100.

The memory 120 is hardware for storing various data processed in the neural network device 10. For example, the memory 120 may store data processed in the neural network device 10 and data to be processed. Furthermore, the memory 120 may store applications, drivers, and the like to be driven by the neural network device 10. The memory 120 may include random access memory (RAM) such as dynamic random access memory (DRAM) or static random access memory (SRAM), read-only memory (ROM), electrically erasable programmable read-only memory (EEPROM), a CD-ROM, a Blu-ray or another optical disk storage device, a hard disk drive (HDD), a solid state drive (SSD), or a flash memory.

The processor 110 may generate a trained first neural network by training a first neural network which is a skip connection-based neural network for removing noise from a noisy speech signal. The skip connection may denote a connection structure in a neural network in which a value input to a layer of a neural network is added to a value output from another layer of the neural network. For example, the skip connection may be a connection structure in which a value of an input layer of the neural network is added to a value of an output layer of the neural network. The first neural network based on a skip connection, may output a value of an output layer to which a value of input layer is added as a value of a final output layer.

A noisy speech signal may denote a speech signal in which noise is mixed, and a clean speech signal may denote a speech signal from which noise is removed. Accordingly, the clean speech signal may be a speech signal obtained by removing noise from the noisy speech signal.

The processor 110 may obtain information about a first noisy speech signal as input information of the first neural network, and may obtain information about a first clean speech signal that is obtained by removing noise from the first noisy speech signal as target information that may be a correct answer about the input information. According to an example, the processor 110 may obtain the input information and the target information of the first neural network from the memory 120. According to another example, the processor 110 may obtain the input information and target information for the first neural network from an acoustic sensor in the neural network device 10.

The processor 110 may train the first neural network according to the obtained input information and the target information, and may generate a trained first neural network. In detail, the processor 110 may train the first neural network so that the first neural network removes noise from a noisy speech signal according to the input information and the target information. Accordingly, the trained first neural network may output a clean speech signal by removing noise from the noisy speech signal.

Accordingly, the processor 110 may generate a trained first neural network having a speech enhancement function through the training process described above.

Figure 2:
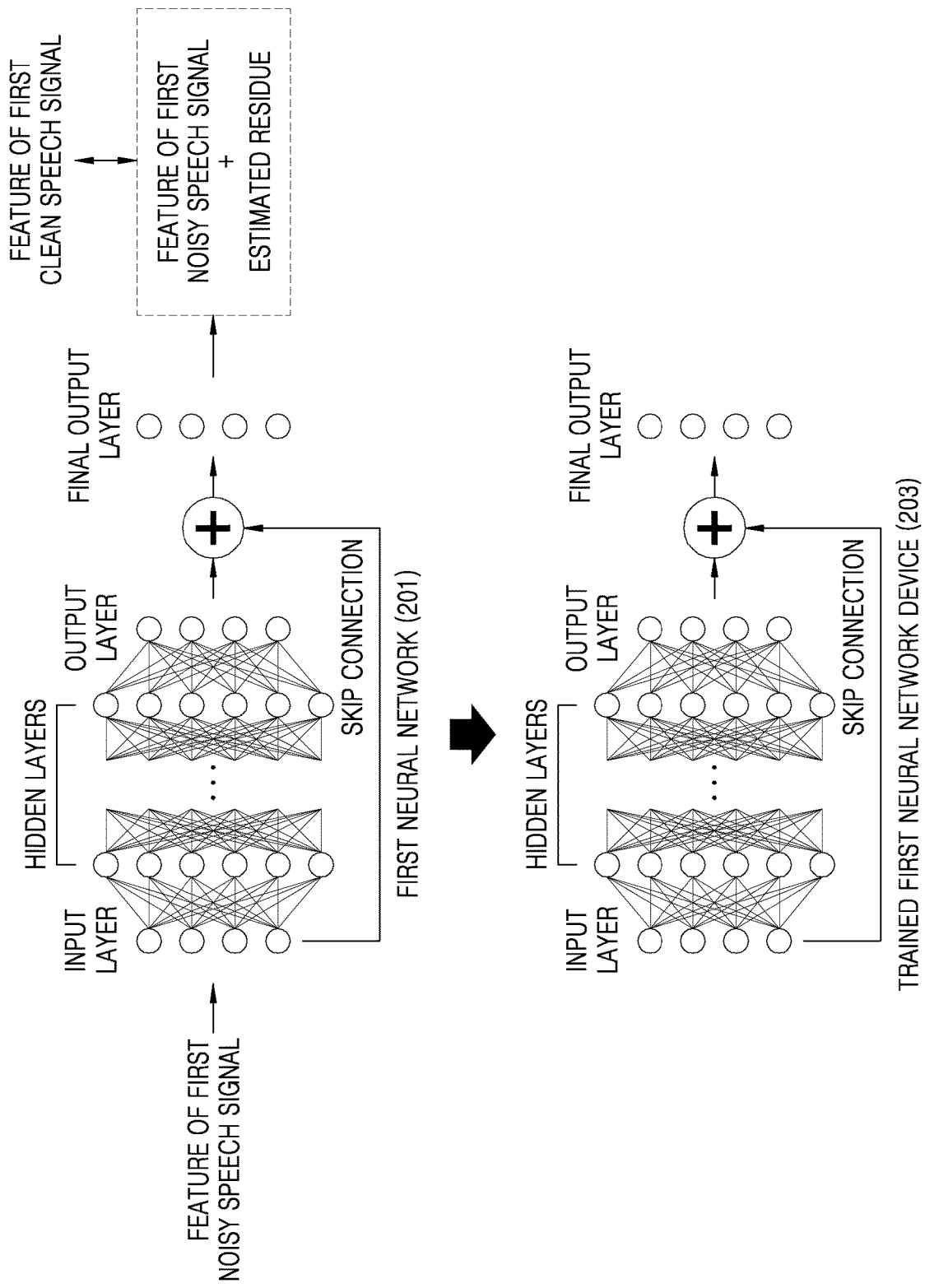
FIG. 2 is a view of an embodiment in which a processor trains a first neural network.

FIG. 2 is a view of an embodiment in which a processor trains a first neural network.

The processor 110 may generate a first neural network 201 including an input layer, hidden layers, an output layer, and a final output layer. The processor 110 may generate the first neural network 201 which is a skip connection-based neural network, and thus, the first neural network 201 may output a value of the output layer to which a value of the input layer is added as a value of the final output layer. In FIG. 2 a deep neural network is depicted as an example of the first neural network 201, but the embodiment is not limited thereto. The first neural network 201 may also be a convolution neural network, a recurrent neural network, a time delay neural network, or a multi-layer perceptron (MLP) neural network as a variation of the deep neural network, and may be a neural network that is a variation of other deep neural networks. Also, the number of nodes, the number of hidden layers, etc. that constitute each layer of the neural networks shown in FIGS. 2 through 7 are merely one example, and are not limited thereto.

The processor 110 may train the first neural network 201 so that the first neural network 201 removes noise from a noisy speech signal, and may generate a trained first neural network 203.

First, the processor 110 may obtain a first noisy speech signal as input information of the first neural network 201, and may obtain a first clean speech signal as target information of the first neural network 201. In detail, the processor 110 may set a feature of the first noisy speech signal as a value of an input layer of the first neural network 201, and may set a feature of the first clean speech signal as a target value of a final output layer of the first neural network 201. According to an example, the processor 110 may use an amplitude or power of the noisy speech signal or the first clean speech signal in a frequency region as a feature of the first noisy speech signal of the first clean speech signal by performing a Fast Fourier Transform (FFT) on the first noisy speech signal or the clean speech signal. According to another example, the processor 110 may use a log band energy, a mel band energy, or mel frequency cepstral coefficients (MFCCs) of the first noisy speech signal or the first clean speech signal as a feature of the first noisy speech signal or the first clean speech signal.

Next, the processor 110 may train the first neural network 201 according to a feature of the set first noisy speech signal and a feature of the set first clean speech signal. Also, the processor 110 may repeatedly train the first neural network 201 according to the features of the plurality of first noisy speech signals and the plurality of first clean speech signals. Accordingly, a value of the final output layer of the first neural network 201 may be a feature of an estimated first clean speech signal, and the training process may be repeated so that the feature of the estimated first clean speech signal is gradually similar to the feature of the first clean speech signal. Also, since the first neural network 201 is based on a skip connection-based neural network, a value of the final output layer may be a value in which a value (the feature of the first noisy speech signal) of the input layer is added to a value (estimated residual) of the output layer. Accordingly, as the value of the final output layer of the first neural network 201 is gradually similar to the feature of the first clean speech signal, the value (estimated residual) of the output layer may be gradually similar to a value for removing elements related to a noisy speech signal from the feature of the first noisy speech signal. In other words, as the training process is repeated, the output layer of the first neural network 201 may be trained in a direction of precisely removing the noise from the first noisy speech signal, and as a result, the final output layer of the first neural network 201 may be trained to output further similar to the first clean speech signal.

The trained first neural network 203 by the processor 110 may have a speech improvement function, and thus, may generate a clean speech signal by removing noise from a noisy speech signal.

Referring to FIG. 1, the processor 110 may generate a trained second neural network to recognize a speaker of a speech signal by training the second neural network.

The processor 110 may obtain information about a second clean speech signal as input information of the second neural network. For example, the second clean speech signal may be an estimated clean speech signal that is output from the first neural network in a training process of the first neural network. The processor 110 may obtain speaker identification information about the second clean speech signal as target information that may be a correct answer about input information. The speaker identification information may be a vector by which a speaker of the second clean speech signal is labeled. For example, the speaker identification information may be a one-hot vector. Also, when the number of speakers included in the training process about the second neural network is N, the speaker identification information may be a vector of an N+1 order. Here, in the vector of the N+1 order, a value of the $N+1^{th}$ vector may provide information about whether a section of the speech signal is a silence section or not through '0' or '1'. Accordingly, the processor 110 may proceed a training by excluding the silence section without an additional voice activity detection (VAD) through the value of the $N+1^{th}$ vector. According to an example, the processor 110 may obtain input information and target information of the second neural network from the memory 120. According to another example, the processor 110 may obtain the input information and the target information of the second neural network from an acoustic sensor in the neural network device 10.

The processor 110 may train the second neural network according to the obtained input information and the target information, and may generate a trained second neural network. In detail, the processor 110 may train the second neural network so that the second neural network recognizes a speaker of a speech signal according to the input information and the target information. Accordingly, the trained second neural network may recognize a speaker of a speech signal. Also, when the second neural network is trained through an output of the first neural network, the trained second neural network may recognize a speaker of a clean speech signal.

Accordingly, the processor 110 may generate the second neural network having a speaker recognition function through the training process described above.

Figure 3:
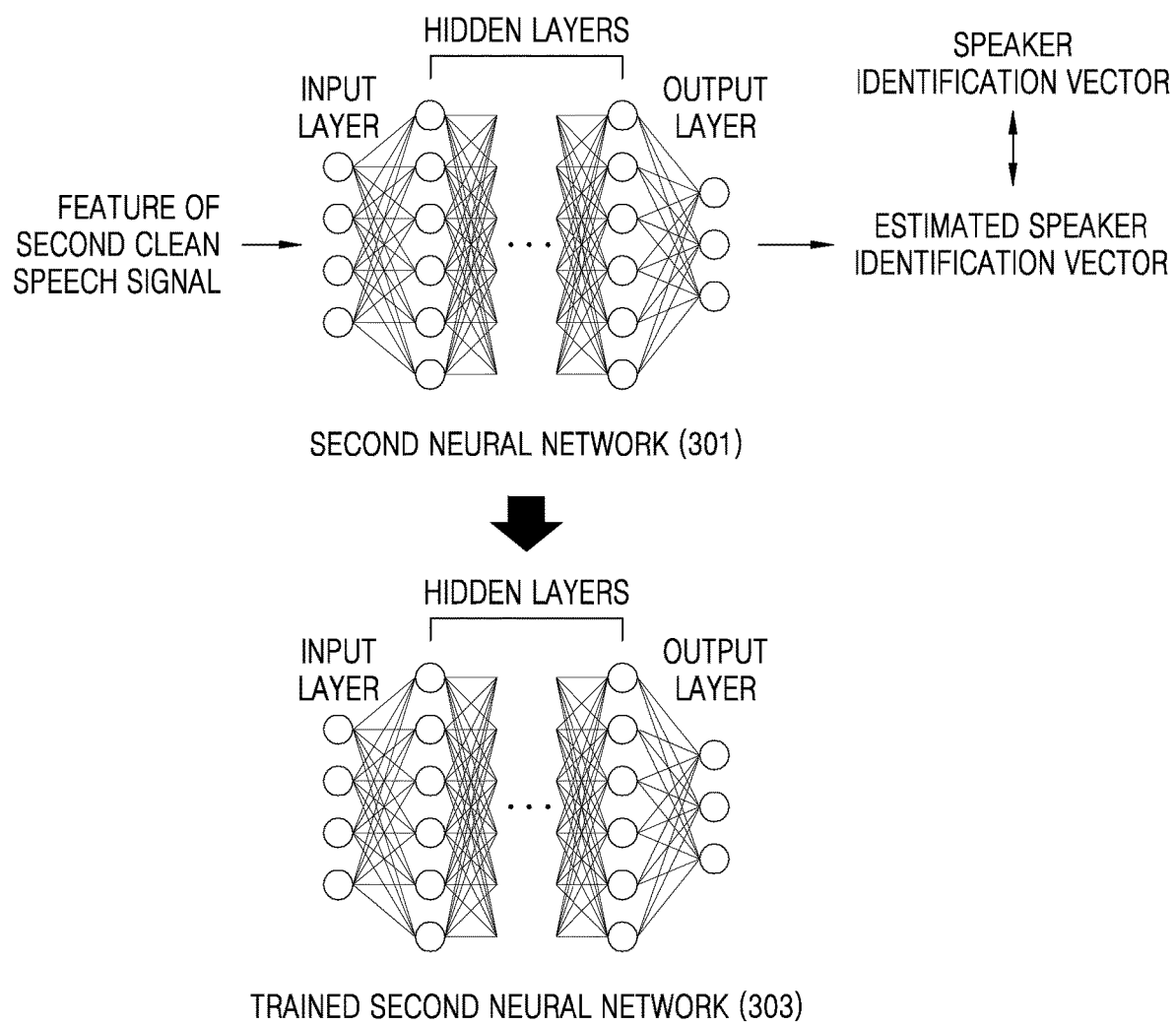
FIG. 3 is a view of an embodiment in which a processor trains a second neural network.

FIG. 3 is a view of an embodiment in which the processor 110 trains the second neural network.

The processor 110 may generate a second neural network 301 including an input layer, hidden layers, and an output layer. In FIG. 3, as an example of the second neural network, a deep neural network as the same kind of the first neural network 201 of FIG. 2 is depicted. But the embodiment is not limited thereto. In other words, the second neural network may be a convolution neural network or a recurrent neural network as a variation of the deep neural network, and may be a neural network that is a variation of other deep neural networks.

The processor 110 may train the second neural network 301 so that the second neural network 301 recognizes a speaker of a speech signal, and may generate a trained second neural network 303.

First, the processor 110 may obtain a second clean speech signal as input information of the second neural network 301. In detail, the processor 110 may set a feature of the second clean speech signal as a value of an input layer of the second neural network 301. For example, the feature of the second clean speech signal may be the feature of an estimated first clean speech signal output from the first neural network 201 of FIG. 2. In other words, the feature of the estimated first clean speech signal output in a process of training the first neural network 201 may be the feature of the second clean speech signal input in a process of training the second neural network 301. Also, the processor 110 may obtain speaker identification information about the second clean speech signal as target information of the second neural network 301. In other words, the processor 110 may obtain a speaker identification vector by which a specific speaker who has been uttered the second clean speech signal is identified. In detail, the processor 110 may set a one-hot vector that may identify a speaker of the second clean speech signal as a target value of an output layer of the second neural network 301.

Next, the processor 110 may train the second neural network 301 according to the feature of the set second clean speech signal and the speaker identification vector. Also, the processor 110 may repeatedly train the second neural network 301 according to the features of the plurality of second clean speech signals and the plurality of speaker identification vectors. Accordingly, a value of the output layer of the second neural network 301 may be an estimated speaker identification vector, and the training process may be repeated so that the estimated speaker identification vector is gradually similar to the speaker identification vector.

The trained second neural network 303 by the processor 110 may have a speaker recognition function, and thus, may recognize a speaker of a speech signal.

Referring to FIG. 1, the processor 110 may generate a third neural network by combining the trained first neural network with the trained second neural network. In detail, the processor 110 may generate the third neural network by setting the final output layer of the trained first neural network as an input layer of the trained second neural network.

The processor 110 may generate the trained third neural network to recognize a speaker of a noisy speech signal by training the third neural network.

The processor 110 may obtain information about a second noisy speech signal as input information of the third neural network. Also, the processor 110 may obtain speaker identification information about the second noisy speech signal as target information that may be a correct answer about input information. According to an example, the processor 110 may obtain the input information and the target information of the third neural network from the memory 120. According to another example, the processor 110 may obtain the input information and the target information of the third neural network from an acoustic sensor in the neural network device.

The processor 110 may train the third neural network according to the obtained input information and the target information, and may generate a trained third neural network. In detail, the processor 110 may train the third neural network so that the third neural network recognizes a speaker of a noisy speech signal according to the input information and the target information. Accordingly, the trained third neural network may recognize the speaker of the noisy speech signal. In detail, the trained third neural network may remove noise from the noisy speech signal, and may recognize the speaker of a clean speech signal obtained by removing noise from the noisy speech signal.

Accordingly, the neural network device 10 may generate the third neural network by combining the first neural network having a speech enhancement function with the second neural network having a speaker recognition function, and may generate a trained third neural network simultaneously having the speech enhancement function and the speaker recognition function by training the third neural network.

The third neural network may include the skip connection of the first neural network as it is, and even though the third neural network is trained, the third neural network may maintain the speech enhancement function as it is due to the skip connection. In other words, the skip connection in the third neural network may perform as a regularizer to prevent the third neural network from losing the speech enhancement function in a process of training the third neural network. In detail, as described with reference to FIG. 2, the value of the first layer in the third neural network to which a noisy speech signal is added due to the skip connection may be trained in a direction of removing noise from the noisy speech signal, and thus, a value of a second layer next to the first layer of the third neural network may be a feature of the clean speech signal that is obtained by removing noise from the noisy speech signal. Accordingly the processor 110 may generate a clean speech signal obtained by removing noise from the noisy speech signal by extracting a value of a second layer of the trained third neural network to which information about the noisy speech signal is input.

An initial weight value and an initial bias value of the third neural network may be weight values and bias values of the pre-trained first neural network and the second neural network, and thus, the third neural network may be trained as a neural network having a higher performance than a case in which an initial weight value and a bias value are arbitrary set. Also, as described with reference to FIG. 3, an output of a training process of the first neural network may be set as an input of a training process of the second neural network, and thus, the trained third neural network may perform a strong speaker recognition about noise.

Figure 4:
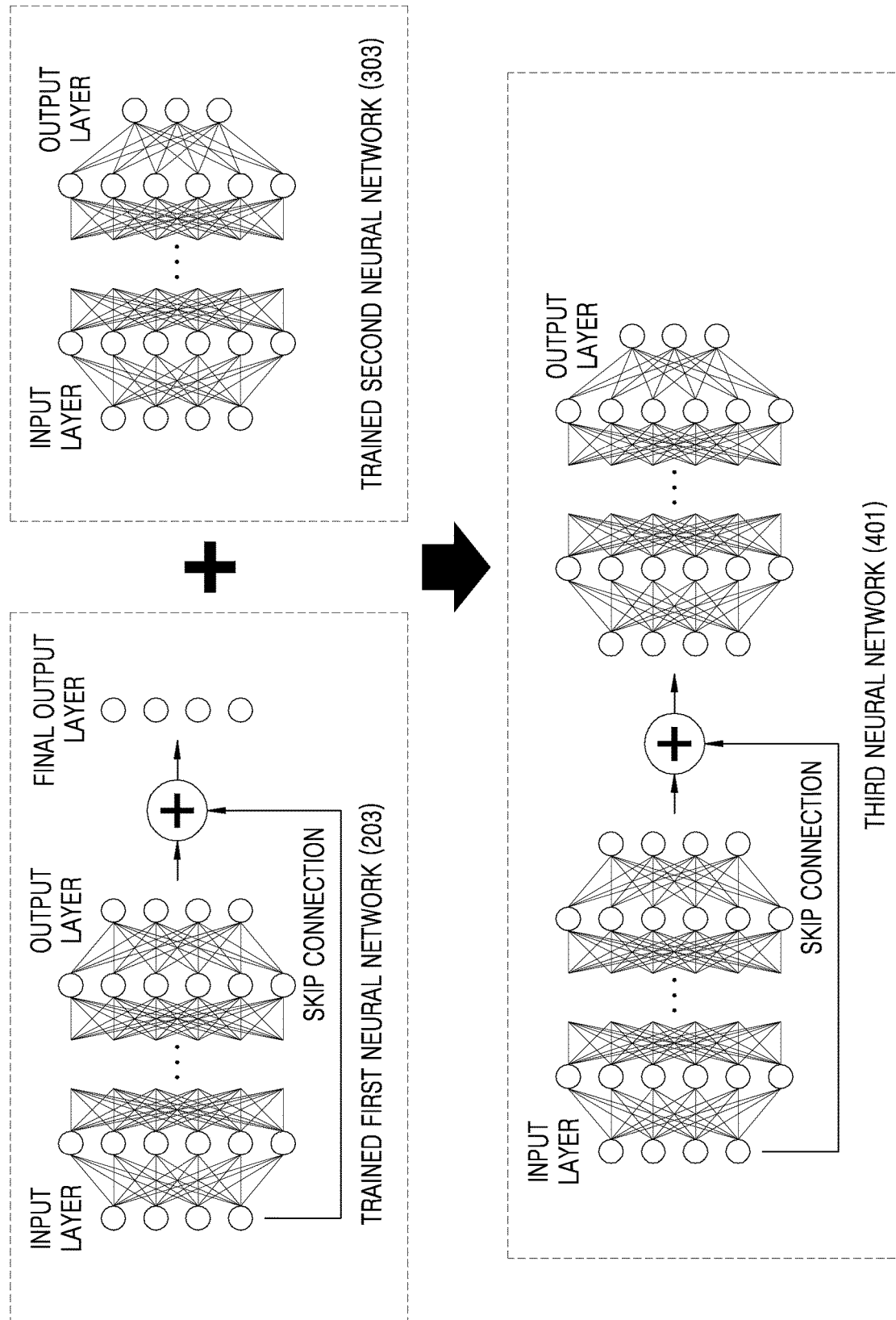
FIG. 4 is a view of an embodiment in which a processor generates a third neural network.

FIG. 4 is a view of an embodiment in which a processor generates the third neural network.

The processor 110 may generate a third neural network 401 by combining the trained first neural network 203 of FIG. 2 with the trained second neural network 303 of FIG. 3.

The processor 110 may generate the third neural network 401 by setting a final output layer of the trained first neural network 203 as an input layer of the trained second neural network 303. In other words, the processor 110 may combine the trained first neural network 203 and the trained second neural network 303 so that the output of the trained first neural network 203 is an input of the trained second neural network 303. Also, the third neural network 401 may include the skip connection of the trained first neural network 203 as it is.

Figure 5:
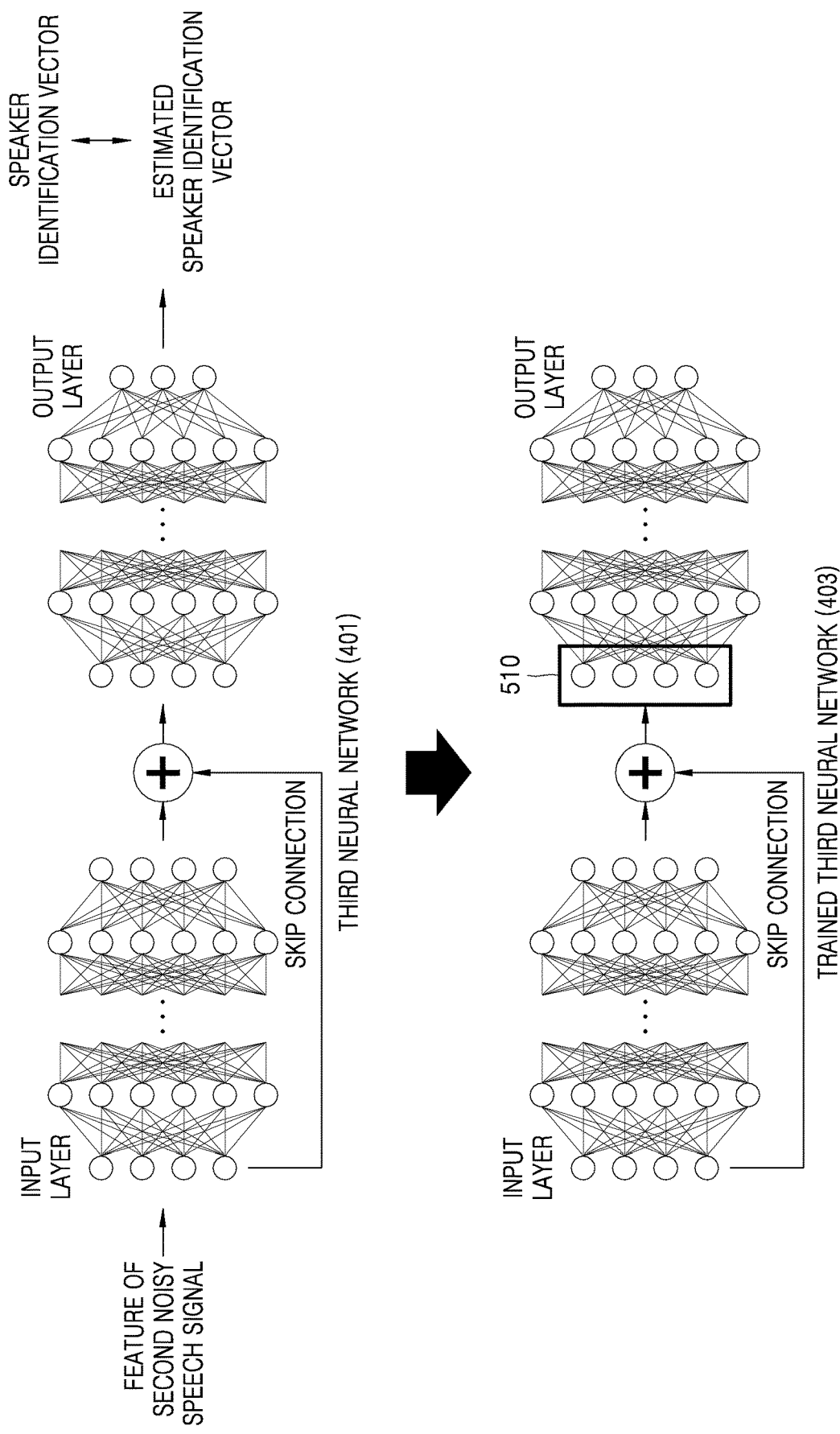
FIG. 5 is a view of an embodiment in which a processor trains a third neural network.

FIG. 5 is a view of an embodiment in which the processor 110 trains the third neural network.

The processor 110 may train the third neural network 401 so that the third neural network 401 of FIG. 4 recognizes a speaker of a noisy speech signal, and may generate a trained third neural network 403.

First, the processor 110 may obtain a second noisy speech signal as input information of the third neural network 401. In detail, the processor 110 may set a feature of the second noisy speech signal as a value of an input layer of the third neural network 401. Also, the processor 110 may obtain speaker identification information about the second noisy speech signal as target information of the third neural network 401. In other words, the processor 110 may obtain the speaker identification information that identifies a specific speaker who has uttered in the second clean speech signal. In detail, the processor 110 may set a speaker identification vector, by which a speaker who has uttered in the second clean speech signal is identified, as a target value of an output layer of the third neural network 401.

Next, the processor 110 may train the third neural network 401 according to the feature of the set second noisy speech signal and the speaker identification vector. Also, the processor 110 may repeatedly train the third neural network 401 according to the features of a plurality of the second noisy speech signals and a plurality of speaker identification vectors. Accordingly, a value of an output layer of the third neural network 401 may be an estimated speaker identification vector, and the training process may be repeated so that the estimated speaker identification vector is gradually similar to the speaker identification vector.

The trained third neural network 403 trained by the processor 110 may simultaneously have a speech enhancement function and a speaker recognition function, and thus, may recognize a speaker of a noisy speech signal. Also, the trained third neural network 403 may maintain the speech enhancement function as it is due to a skip connection, and thus, the neural network device 10 may generate a clean speech signal obtained by removing noise from the noisy speech signal by extracting a value of a layer 510 of the trained third neural network 403 to which information about the noisy speech signal is input.

Referring to FIG. 1, the processor 110 may register a speaker by using the trained third neural network. In detail, the processor 110 may obtain a noisy speech signal of a speaker. Next, the processor 110 may obtain feature information for speaker recognition about the noisy speech signal by using the trained third neural network. For example, the processor 110 may obtain feature information for speaker recognition about the noisy speech signal by extracting a value of a last hidden layer of the trained third neural network to which information about the noisy speech signal is input. In other words, the processor 110 may obtain feature information for speaker recognition about the noisy speech signal by extracting an output vector of the last hidden layer of the trained third neural network that may be referred to as a d-vector. Also, when information about the noisy speech signal is input to the trained third neural network in the form of a plurality of frames, the processor 110 may extract a value of the last hidden layer of the third neural network for each of the plurality of frames, and may obtain an average value of the values of the plurality of frames as the feature information for speaker recognition. Also, the processor 110 may obtain feature information for speaker recognition about the noisy speech signal sentence by sentence.

Next, the processor 110 may store the speaker identification information together with the feature information for speaker recognition in the memory 120 to register a speaker. A more specific embodiment will be described below with reference to FIG. 6.

The processor 110 may recognize a speaker of the noisy speech signal by using the trained third neural network.

First, the processor 110 may obtain a noisy speech signal. Next, the processor 110 may use the trained second neural network to obtain feature information for speaker recognition of the noisy speech signal. In detail, when the processor 110 inputs information about a noisy speech signal to the trained third neural network, the trained third neural network performs a process of removing noise from the noisy speech signal and recognizing a speaker of a clean speech signal from which noise is removed. In this case, the processor 110 may extract a value of the last hidden layer of the trained third neural network to obtain feature information for speaker recognition of the noisy speech signal.

Next, the processor 110 may recognize a speaker of a noisy speech signal by comparing the feature information for speaker recognition about the noisy speech signal with the pre-registered feature information for speaker recognition. In detail, the processor 110 may recognize a speaker having feature information that is the most similar to the feature information for speaker recognition about the noisy speech signal as a speaker of the noisy speech signal by determining the degree of similarity between pieces of the feature information. For example, the processor 110 may use a method, such as cosine similarity, probabilistic linear discriminant analysis (PLDA), or the like as a method for determining the degree of similarity between pieces of feature information. Also, after determining the degree of similarity between pieces of the feature information, when the degree of similarity is less than a set critical value, the processor 110 may determine that speaker is not match to each other.

Accordingly, the neural network device 10 uses a neural network simultaneously having the speech enhancement function and the speaker recognition function, and thus, a time required for speech enhancement and speaker recognition may be reduced. Therefore, the neural network device 10 may be operated even in a real-time operating environment.

Figure 6:
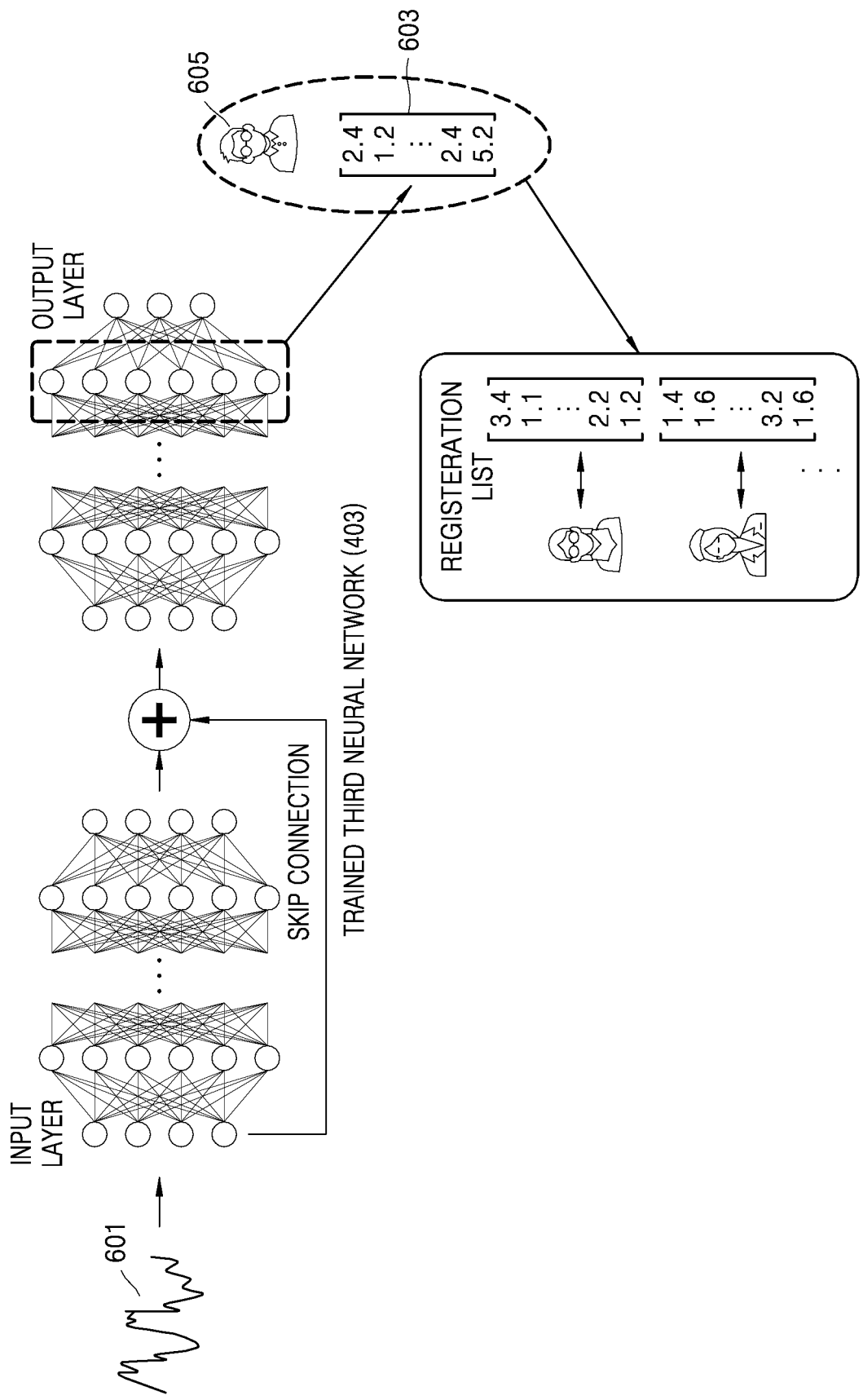
FIG. 6 is a view of an embodiment in which a processor registers a speaker.

FIG. 6 is a view of an embodiment in which a processor registers a speaker.

The processor 110 may register a speaker by using the trained third neural network 403.

The processor 110 may obtain a noisy speech signal 601 of a speaker. Next, the processor 110 may obtain feature information 603 for speaker recognition about the noisy speech signal 601 by using the trained third neural network 403. In detail, the processor 110 may extract a value of a last hidden layer of the trained third neural network 403 to which information about the noisy speech signal 601 is input to obtain feature information 603 for speaker recognition about the noisy speech signal 601.

Next the processor 110 may store the feature information 603 for speaker recognition and speaker identification information 605 in the memory to register the speaker, and may up-date a registration list.

Figure 7:
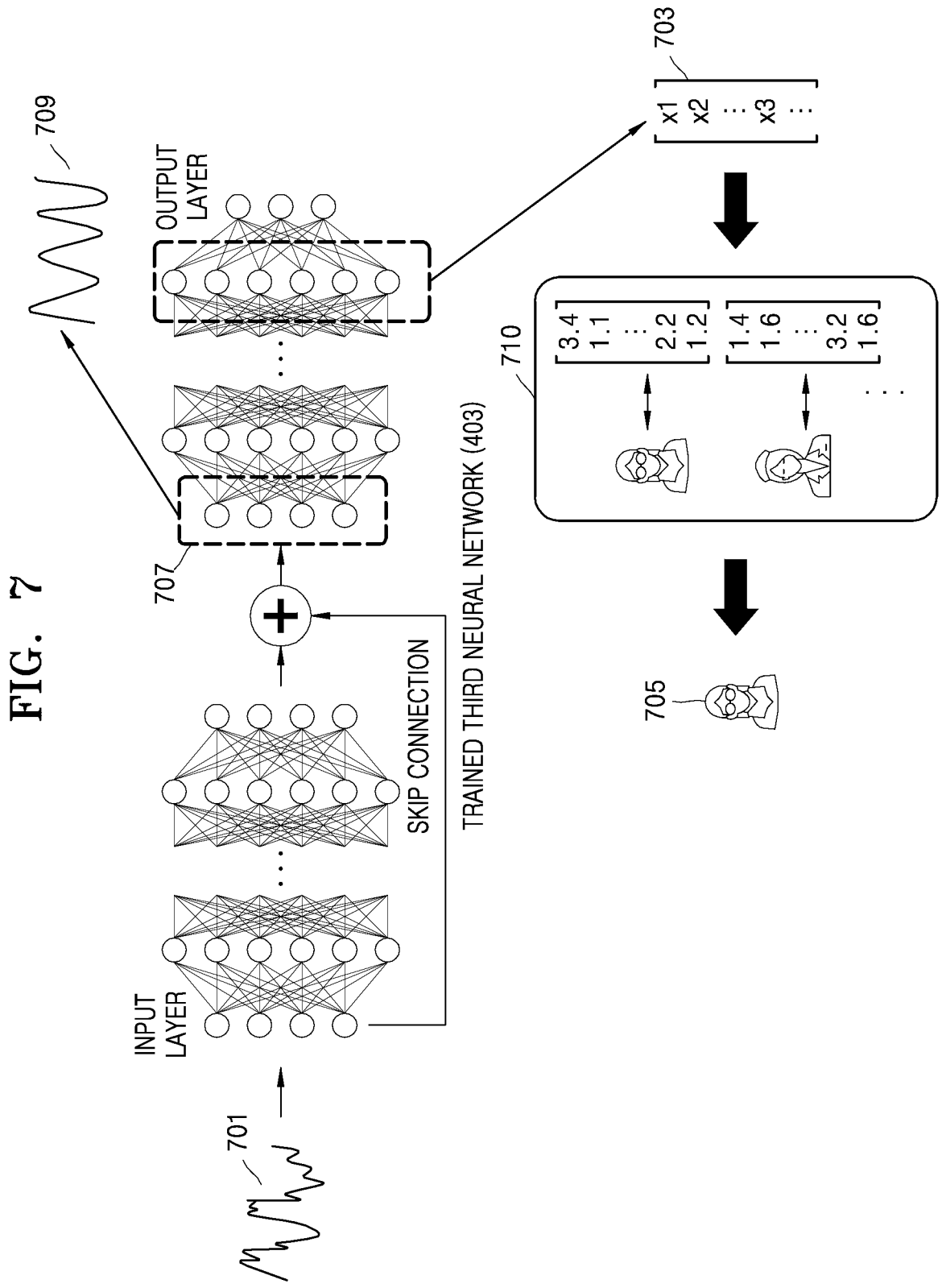
FIG. 7 is a view of an embodiment in which a processor recognizes a speaker of a noisy speech signal.

FIG. 7 is a view of an embodiment in which the processor 110 recognizes a speaker of a noisy speech signal 701.

The processor 110 may obtain a noisy speech signal 701. Next, the processor 110 may obtain feature information 703 for speaker recognition about the noisy speech signal 701 by using the trained third neural network 403. In detail, when information about the noisy speech signal 701 is input to the trained third neural network 403, the trained third neural network 403 performs a process of recognizing a speaker about the noisy speech signal 701, and thus, the feature information 703 for speaker recognition about the noisy speech signal 701 may be included in a value of a last hidden layer of the trained third neural network 403. Accordingly, the processor 110 may obtain the feature information 703 for speaker recognition about the noisy speech signal 701 by extracting the value of the last hidden layer of the trained third neural network 403.

Next, the processor 110 may compare the obtained feature information 703 for speaker recognition with pre-registered feature information 710 for speaker recognition. In detail, the processor 110 may confirm feature information for speaker recognition having the highest degree of similarity to the feature information 703 for speaker recognition among pieces of the pre-registered feature information 710 for speaker recognition. Next, the processor 110 may recognize a speaker 705 corresponding to the feature information 710 for speaker recognition having the highest degree of similarity to the feature information 703 for speaker recognition as the speaker of the noisy speech signal 701.

Also, when the information about the noisy speech signal 701 is input to the trained third neural network 403, the processor 110 may extract a value of a layer 707 of the trained third neural network 403 to generate a clean speech signal 709 that is obtained by removing noise from the noisy speech signal 701.

Figure 8:
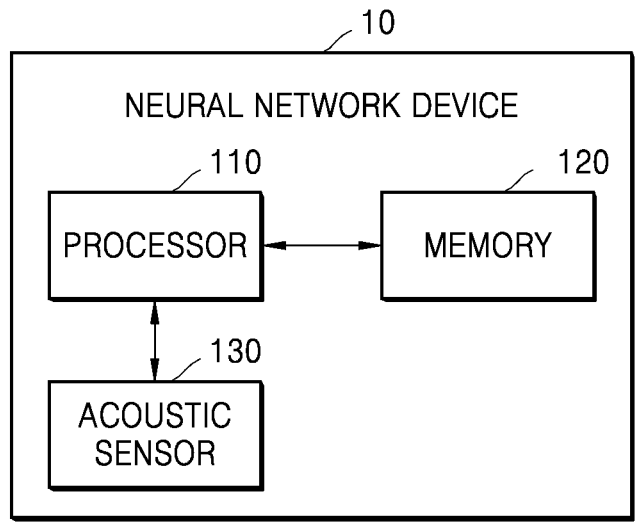
FIG. 8 is a block diagram of a hardware configuration of a neural network device, according to another embodiment.

FIG. 8 is a block diagram of a hardware configuration of a neural network device 10, according to another embodiment.

The neural network device 10 may further include an acoustic sensor 130 in addition to the processor 110 and the memory 120 of FIG. 1.

The acoustic sensor 130 may include at least one of a wide-band microphone, a resonator microphone, and a narrow-band resonator microphone array.

The acoustic sensor 130 may sense a speech signal of a speaker. The sensed speech signal of the speaker may be a noisy speech signal in which noise is mixed. Next, the processor 110 may obtain feature information for speaker recognition about the sensed speech signal of the speaker by using a trained third neural network. Thereafter, the processor 110 may store the obtained feature information for speaker recognition in the memory 120 together with speaker identification information to register the speaker.

The acoustic sensor 130 may sense a speech signal of a speaker. The sensed speech signal of the speaker may be a noisy speech signal in which noise is mixed. Next, the processor 110 may obtain feature information for speaker recognition about the sensed speech signal by using the trained third neural network. Next, the processor 110 may compare the feature information for speaker recognition about the sensed speech signal with feature information about at least one pre-registered speaker to recognize a speaker of the sensed speech signal.

Figure 9:
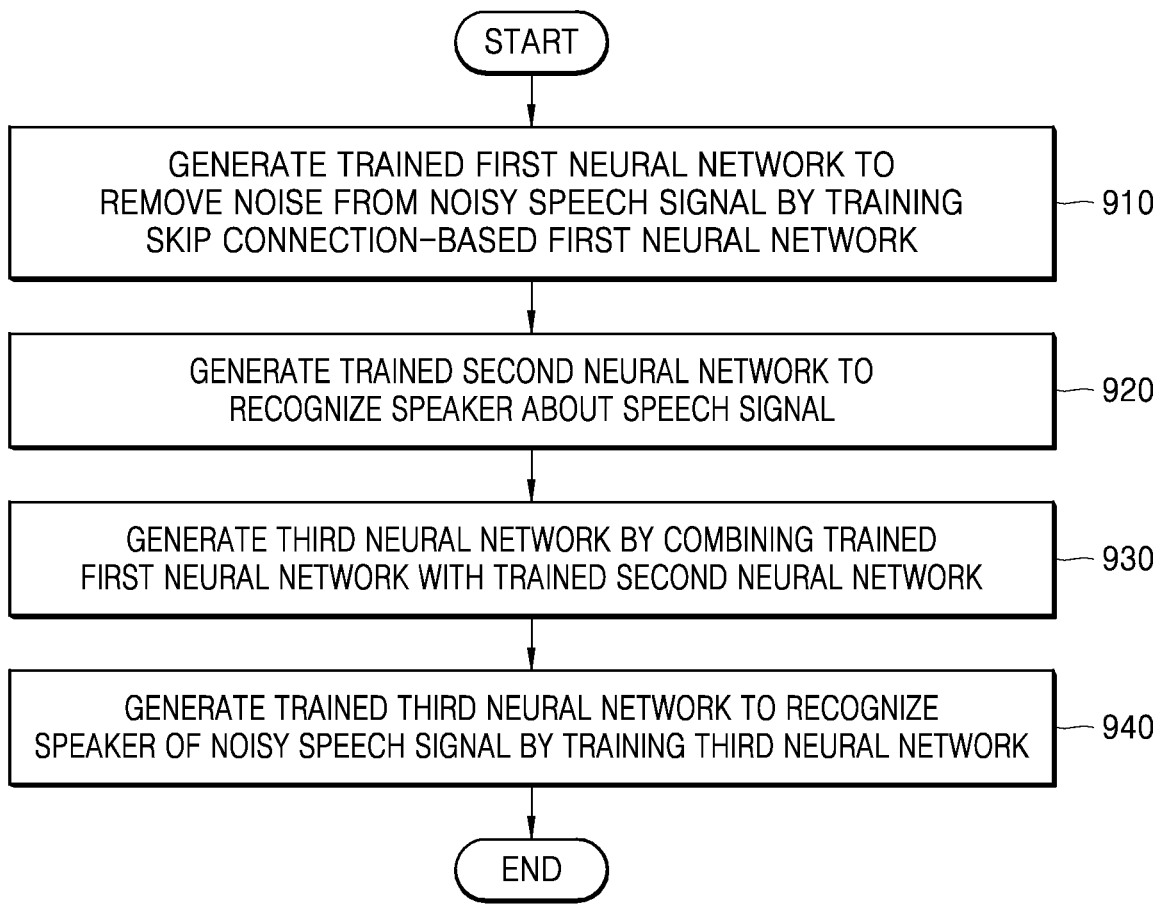
FIG. 9 is a flowchart of a method of operating a neural network device according to an embodiment.

FIG. 9 is a flowchart of a method of operating the neural network device 10, according to an embodiment.

The method shown in FIG. 9 may be performed by each component of the neural network device 10 of FIGS. 1 and 8, and repeated descriptions thereof will be omitted.

In operation 910, the neural network device 10 may generate a trained first neural network to remove noise from the noisy speech signal by training a first neural network which is a skip connection-based neural network.

The neural network device 10 may obtain information about a first noisy speech signal as input information of the first neural network, and may obtain information about a first clean speech signal obtained by removing noise from the first noisy speech signal as target information that may be a correct answer about input information.

The neural network device 10 may train the first neural network according to obtained input information and target information, and may generate a trained first neural network.

In operation 920, the neural network device 10 may generate a trained second neural network to recognize a speaker of a speech signal by training the second neural network.

The neural network device 10 may obtain information about a second clean speech signal as input information of the second neural network, and may obtain speaker identification information about the second clean speech signal as target information that may be a correct answer about input information.

The neural network device 10 may train the second neural network according to obtained input information and the target information, and may generate a trained second neural network.

In operation 930, the neural network device 10 may generate a third neural network by combining the trained first neural network with the trained second neural network.

In detail, the neural network device 10 may generate the third neural network by setting a final output layer of the trained first neural network as an input layer of the trained second neural network.

In operation 940, the neural network device 10 may generate a trained third neural network to recognize a speaker of a noisy speech signal by training the third neural network.

The neural network device 10 may obtain information about the second noisy speech signal as input information of the third neural network. Also, the neural network device 10 may obtain speaker identification information about the second noisy speech signal as target information that may be a correct answer about input information.

The neural network device 10 may train the third neural network according to the obtained input information and the target information, and may generate a trained third neural network.

Also, the neural network device 10 may obtain a noisy speech signal of a speaker. Next, the neural network device 10 may obtain feature information for speaker recognition about the noisy speech signal by using the trained third neural network, and may store the obtained feature information for speaker recognition together with the speaker identification information to register the speaker.

Also, the neural network device 10 may obtain a noisy speech signal. Next, the neural network device 10 may obtain feature information for speaker information about the sensed noisy speech signal by using the trained third neural network, and may recognize a speaker of the sensed noisy speech signal by comparing the obtained feature information for speaker recognition with pre-registered feature information for speaker recognition.

According to the embodiments of the disclosure, the neural network device may generate a third neural network by combining a first neural network having a speech enhancement function with a second neural network having a speaker recognition function, and may generate a trained third neural network simultaneously having the speech enhancement function and the speaker recognition function by training the third neural network.

Also, according to the embodiments of the disclosure, the third neural network may include a skip connection of the first neural network as it is, and although the third neural network is trained, the third neural network may maintain the speech enhancement function as it is due to the skip connection.

Also, according to the embodiments of the disclosure, the neural network device uses a neural network simultaneously having the speech enhancement function and the speaker recognition function, and thus, a time for recognizing speech enhancement and speaker recognition may be reduced. Therefore, the neural network device may be operated even in a real-time operating environment.

Embodiments of the disclosure may be implemented as a computer-readable program, and may be realized in general computers that execute the program by using computer-readable recording media. Also, data structures used in the methods described above may be recorded in computer-readable recording media. The computer-readable medium may be magnetic storage media (e.g., ROM, floppy disks, hard disks, etc.) and optical recording media (e.g., CD-ROMs or DVDs), and transmission media such as Internet transmission media.

In the spirit and scope of the disclosure, it will be understood by those of ordinary skill in the art that various changes in form and details may be made therein without departing from the spirit and scope of the disclosure as defined by the appended claims. Therefore, the embodiments should be considered in descriptive sense only and not for purposes of limitation, and the scope of the disclosure is defined not by the detailed description of the disclosure but by the appended claims, and all differences within the scope will be construed as being included in the disclosure.

What is claimed is:

1. A neural network device for speaker recognition, the neural network device comprising:
a memory configured to store at least one program; and
a processor configured to execute the at least one program to:
receive first training information including a first input speech signal;
train a first neural network using the first training information to generate a trained first neural network, the first neural network being a skip connection-based neural network configured to remove noise from the first input speech signal,
receive second training information including a second input speech signal;
train a second neural network using the second training information to generate a trained second neural network, the second neural network configured to recognize a speaker in the second input speech signal,
generate a third neural network by combining the trained first neural network with the trained second neural network by connecting an input layer of the trained second neural network to a final output layer of the trained first neural network,
receive third training information including a third input speech signal; and
train the third neural network using the third training information to generate the trained third neural network, the third neural network including a skip connection in which a value of an input layer of the third neural network is added to a value of an intermediate layer of the third neural network, and the third neural network configured to perform speech enhancement using the skip connection and recognize a speaker in the third input speech signal, which is a noisy speech signal.

2. The neural network device of claim 1, wherein the first neural network comprises a plurality of layers, and wherein the first neural network is further configured to add a value of an input layer, among the plurality of layers, to a value of an output layer, among the plurality of layers, and output the value of the output layer as a value of a final output layer based on a skip connection.

3. The neural network device of claim 1, wherein the first training information further includes a first target speech signal that is obtained by removing noise from the first input speech signal as target information, and
wherein the processor is further configured to train the first neural network based on the first input speech signal and the first target speech signal.

4. The neural network device of claim 1, wherein
the second training information further includes speaker identification information corresponding to the second input speech signal, and
wherein the processor is further configured to train the second neural network based on the second input speech signal and the speaker identification information.

5. The neural network device of claim 4, wherein the second input speech signal comprises an estimated clean speech signal that is output from the first neural network during training of the first neural network.

6. The neural network device of claim 1, wherein
the third training information further includes speaker identification information corresponding to the third input speech signal, and
wherein the processor is further configured to train the third neural network based on the third input speech signal and the speaker identification information.

7. The neural network device of claim 1, wherein the processor is further configured to generate the third neural network by setting a final output layer of the trained first neural network as an input layer of the trained second neural network.

8. The neural network device of claim 1, further comprising:
an acoustic sensor configured to sense a noisy speech signal,
wherein the processor is configured to:
obtain feature information for speaker recognition from the sensed noisy speech signal by using the trained third neural network, and
recognize a speaker of the sensed noisy speech signal by comparing the feature information for speaker recognition with a pre-registered feature information for speaker recognition.

9. The neural network device of claim 8, wherein the processor is further configured to obtain feature information for speaker recognition from the sensed noisy speech signal by extracting a value of a last hidden layer of the trained third neural network to which the sensed noisy speech signal is input.

10. The neural network device of claim 8, wherein the processor is further configured to obtain a clean speech signal from the sensed noisy speech signal by extracting a value of a layer of the trained third neural network to which information about the sensed noisy speech signal is input.

11. The neural network device of claim 8, wherein the acoustic sensor comprises at least one of a wide-band microphone, a resonator microphone, or a narrow-band resonator microphone array.

12. The neural network device of claim 1, further comprising:
an acoustic sensor configured to sense a noisy speech signal of a speaker,
wherein the processor is further configured to obtain feature information for speaker recognition from the noisy speech signal of the speaker by using the trained third neural network, and store the obtained feature information for speaker recognition in the memory together with the speaker identification information to register the speaker.

13. An operating method of a neural network device for speaker recognition, the operating method comprising:
receiving first training information including a first input speech signal;
training a first neural network using the first training information to generate a trained first neural network, the first neural network being a skip connection-based neural network configured to remove noise from the first input speech signal;
receiving second training information including a second input speech signal;
training a second neural network using the second training information to generate a trained second neural network, the second neural network configured to recognize a speaker in the second input speech signal;
generating a third neural network by combining the trained first neural network with the trained second neural network by connecting an input layer of the trained second neural network to a final output layer of the trained first neural network;
receiving third training information including a third input speech signal; and
training the third neural network using the third training information to generate the trained third neural network, the third neural network including a skip connection in which a value of an input layer of the third neural network is added to a value of an intermediate layer of the third neural network, and the third neural network configured to perform speech enhancement using the skip connection and recognize a speaker in the third input speech signal, which is a noisy speech signal.

14. The operating method of claim 13, wherein the first training information further includes a first target speech signal that is obtained by removing noise from the first input speech signal, and
wherein the training the first neural network comprises training the first neural network based on the first input speech signal and the first target speech signal.

15. The operating method of claim 13,
wherein the second training information further includes speaker identification information corresponding to the second input speech signal, and
wherein the training the first neural network comprises training the second neural network based on the second input speech signal and the speaker identification information.

16. The operating method of claim 15, wherein the second input speech signal comprises an estimated clean speech signal that is output from the first neural network during the training of the first neural network.

17. The operating method of claim 13, wherein the generating of the third neural network comprises generating the third neural network by setting a final output layer of the trained first neural network as an input layer of the trained second neural network.

18. The operating method of claim 13, further comprising:
sensing a noisy speech signal;
obtaining feature information for speaker recognition according to the sensed noisy speech signal by using the trained third neural network; and
recognizing a speaker of the sensed noisy speech signal by comparing the feature information for speaker recognition with a pre-registered feature information for speaker recognition.

19. The operating method of claim 18, further comprising:
obtaining a clean speech signal about the sensed noisy speech signal by extracting a value of a layer of the trained third neural network to which information about the sensed noisy speech signal is input.

20. A non-transitory computer-readable recording medium having a recorded program for executing the operating method of claim 13 in a computer.

\* \* \* \* \*